United States Patent [19]

Sokolow

[11] 3,868,093
[45] Feb. 25, 1975

[54] MIXING SCREW AND USE THEREOF
[75] Inventor: Nickolas N. Sokolow, Roscoe, Ill.
[73] Assignee: Beloit Corporation, Beloit, Wis.
[22] Filed: July 31, 1973
[21] Appl. No.: 384,235

[52] U.S. Cl. ............................................... 259/191
[51] Int. Cl. ............................ B29b 1/10, B29f 3/02
[58] Field of Search ............. 259/191, 192, 193, 97, 259/9, 10, 6, 7, 8, 25, 26, 45, 46, 68, 69, 109, 110; 425/200, 204, 209; 100/145; 198/213, 214

[56] References Cited
UNITED STATES PATENTS

| 3,160,916 | 12/1964 | Blakey | 259/193 |
|---|---|---|---|
| 3,271,819 | 9/1966 | Lacher | 259/191 |
| 3,300,811 | 1/1967 | Berger | 259/192 |
| 3,445,890 | 5/1969 | Heston | 425/209 |
| 3,446,136 | 5/1969 | Recas | 425/209 |

Primary Examiner—Robert W. Jenkins
Attorney, Agent, or Firm—Hill, Gross, Simpson, Van Santen, Steadman, Chiara & Simpson

[57] ABSTRACT

A screw for an extruder having, in addition to the usual primary flight, at least one secondary flight in its terminal region. The primary and secondary flights are adapted to minimize cross-flow of material between axially adjacent flights and to mix material within channels between axially adjacent such flights. This screw is adapted for use with an extruder, particularly one which has been modified to feed separately preprocessed melts into such extruder in its terminal section. A process for using the extruder screw combination indicated as provided.

6 Claims, 5 Drawing Figures

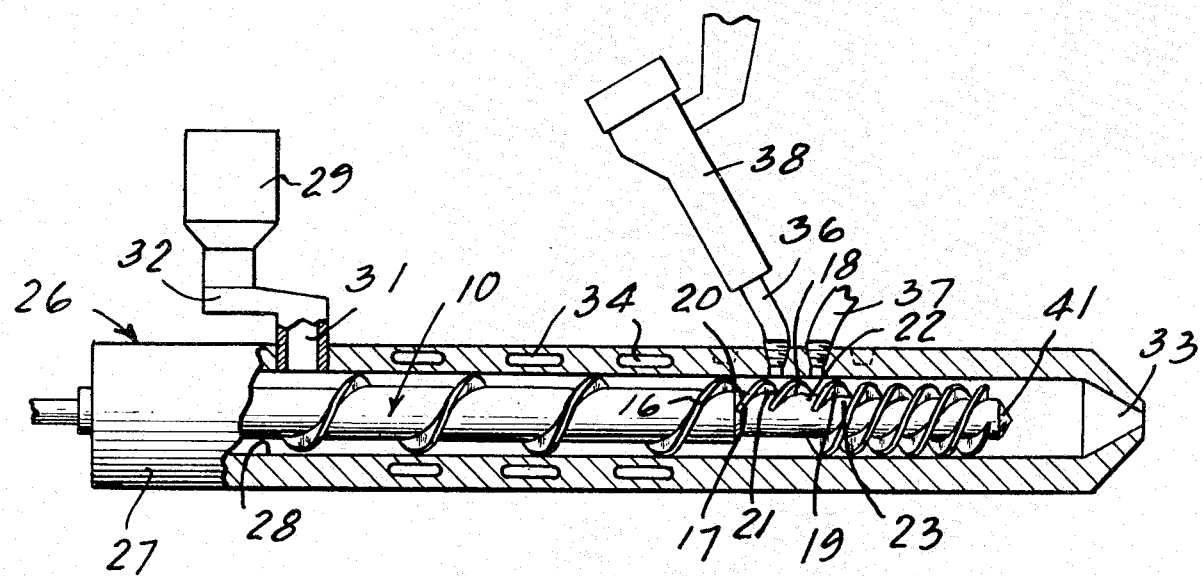

PATENTED FEB 25 1975
3,868,093

3,868,093

MIXING SCREW AND USE THEREOF

BACKGROUND OF THE INVENTION

In general, prior art extruder screws of the type used in the extrusion of thermoplastics and the like are indented to produce an extrudate which is homogeneous. If separate components, for example, are concurrently extruded together, the extruder screw in combination with an associated extruder body are carefully designed to produce homogeneity and uniformity in the product extrudate.

Typically an extruder screw utilizes a single flight which is integral with the screw shank and which radially projects and helically extends axially along such shank with such variables as flight width, flight height, axial distance between adjacent flights, shank diameter, flight pitch and like variables being selected and controlled to achieve the desired homogeneity and uniformity in a particular product extrudate.

Situations arise, however, where the product extrudate should not be so homogeneous and uniform and where one desires to create particular color and/or texture effects in an extrudate. So far as is known, very little equipment and process technology has been heretofore available for directly producing such and other effects in an extrudate.

BRIEF SUMMARY OF THE INVENTION

The present invention provides a screw for an extruder which enables one to produce directly in a product extrudate, among other effects, color and texture variations.

The invention further relates to plastic extruders incorporating such screw and to extruders which are specially modified to receive separately pre-processed melts for selectively intermixing with a preformed melt before extrusion.

The invention still further relates to a process for using such screws and extruders.

Other and further objects, purposes, advantages, utilities, and features will be apparent to those skilled in the art from a reading of the present specification and drawings.

BRIEF SUMMARY OF THE DRAWINGS

In the drawings:

FIG. 1 is a side elevational view of one form of an embodiment of an extruder screw of the present invention;

FIG. 2 is an enlarged detail view in side elevation taken along the terminal region of the screw shown in FIG. 1;

FIG. 3 is a vertical sectional view taken along the line III—III of FIG. 2;

FIG. 4 is a simplified side elevational view of the screw of FIGS. 1–3 in operative combination with an extruder body modified to use such screw, some parts thereof shown in section and some parts thereof broken away; and FIG. 5 is a plan view of one type of characteristic pattern producable in an extrudate from apparatus of the type illustrated in FIG. 4 utilizing the screw of this invention.

DETAILED DESCRIPTION

Reference is first had to FIGS. 1 through 3 which illustrate a screw 10 of this invention. Screw 10 employs an elongated cylindrical shank 11 having, in axially adjacent relationship, a beginning section 12, a mid section 13, and a terminal section 14.

The beginning section 12 is adapted for engagement with a drive means (not shown) for driving the shaft 10 which can be of any conventional form. The beginning section 12 is also adapted to make a sealing engagement with an adjacent wall member in an extruder assembly, which is conventional in nature.

The mid section 13 has an integral, primary, radially projecting, continuous helical flight 16 extending axially therealong and adapted, in combination with the associated shank 11, to melt and mix an extrudate to some predetermined extent when the screw 10 is operating in functional combination with an extruder.

The terminal section 14, in the embodiment shown, has a diameter generally smaller than the diameter of mid section 13. The flight 16 extends therealong continuously from the mid section 13.

At least one additional integral, secondary, radially projecting, continuous helical flight on shank 11 is provided which is in axially spaced relationship to the primary flight 16. In the embodiment shown, there are three such continuous secondary flights designated respectively as 17, 18 and 19. These secondary flights 17, 18 and 19 characteristically commence in the mid section 13 adjacent the terminal section 14 and extend axially along the terminal section 14 helically in spaced relationship to one another, as well as to the flight 16, as indicated.

The primary flight 16 and the secondary flights, here 17, 18 and 19, in combination with one another in the terminal section 14, are adapted to minimize cross-flow of material being moved axially by screw 10 in functional combination with an extruder (not shown in FIGS. 1–3 but see FIG. 4) between axially adjacent flights. Flights 16, 17, 18 and 19 are further adapted in combination to mix material within the interspaced channels 20, 21, 22 and 23 between such axially adjacent such flights 16, 17, 18 and 19. Channels 20, 21, 22 and 23 have a predetermined depth which controls the degree of mixing therewithin, from substantially incomplete to substantially homogeneous. For specialized or particular mixing patterns, the depth and/or width of each channel 20, 21, 22 or 23 may be different.

Referring to FIG. 4 there is seen an extruder 26 for plastics and the like. The extruder 26 utilizes a barrel 27 having a cylindrical bore 28. Within bore 28 is positioned a screw 10, the screw 10 being adapted to advance a plastic along the bore 28 in a direction from the left to the right in the FIG. 4.

Hopper 29 in which an optional amount of powdery thermoplastic resin is stored, said resin optionally containing suitable amounts of other additives such as filler, stabilizers, pigments, die stuffs etc. which also are normally powdered, is used to supply such resin system into the bore 28 through a feed opening 31 by the predetermined amount measured by a quantitative supply device 32. When the screw 10 is rotated, the thermoplastic resin is concurrently mixed and transferred toward the exit 33 formed at the head of the barrel 27.

The barrel 27 is provided with circulation passages 34 for the circulation of a coolant, such as water or the like, in the walls of the barrel 27. Also, a cooling medium, such as water or the like, may be circulated through the shank 11 of screw 10, using inlet and outlet ports (not shown).

As a thermoplastic resin is transported through bore 28, it is melted and mixed conventionally. Sometimes heater elements (not shown) circumscribe the barrel 27 to achieve a desired temperature within the interior of the bore 28, as those skilled in the art will appreciate.

When a thermoplastic material approaches the forward end of the mid section 13 of screw 10 within the bore 28, it reaches the start of the secondary flights 17, 18 and 19. In this vicinity, the bore 28 is interconnected with a feed tube 36 which is adapted to provide a stream of pre-processed hot melt material, such as a thermoplastic polymer or the like. The feed stream from tube 36 is injected through barrel 27 into one of the channels defined between the primary flight 16 and the secondary flights 17, 18 and 19, the channel shown in FIG. 4 being channel 21 for present illustrative purposes. Another hot melt stream similarly pre-processed separately is provided through a supply tube 37 and is injected through the barrel 27 into channel 22 in FIG. 4.

To accommodate the larger volume of material within bore 28, the diameter of the screw 10's shank 11 is reduced in the terminal section 14. The hot melt thermoplastic material originally being supplied towards terminal section 14 by screw 10 in barrel 27 is divided and distributed in channels 20, 21, 22 and 23 provided between the primary and secondary flights 16, 17, 18 and 19, respectively. In the illustration shown in FIG. 4, the channels 20 and 23 can be utilized primarily for the thermoplastic material supplied from the mid section 13 of screw 10 in barrel 27.

The tube 36 can receive its hot melt thermoplastic from an extruder 38 or other mixing device, as those skilled in the art will appreciate. Similar remarks apply to tube 37, although any convenient supply device may be used with tube 37 in FIG. 4.

When the streams of hot melts in respective channels 20, 21, 22 and 23 reach the end of the extruder 41, the respective streams are combined together and extruded through the mouth or exit 33 of the extruder 26.

Those skilled in the art will appreciate that the apparatus as taught above makes possible for the first time a method for combining two separate streams of material. In this method, one revolves one of a pair of generally concentric, cylindrical wall members relative to the other thereof within a process zone. There are a plurality of axially adjacent, helically extending channels radially defined between the cylindrical wall members and axially defined between the cylindrical wall members by a plurality of axially spaced, rib-like projections. Each projection is integral with the revolving one of said wall members and radially extends therefrom to a position in spaced adjacent relationship to such other one of said wall members. Thus, each of such channels is adapted to advance material therealong as such one wall member so revolves, from one end to the opposite end of said process zone.

In the process of the present invention one charges separate streams to be combined to respective individual ones of such channels along such process zone. Preferably the charging occurs at the beginning of the process zone, but can take place at any point along the zone before the opposite end thereof is reached. At the opposite end of the process zone, the streams issuing from the individual channels so charged therewith are combined.

In a preferred form, the revolving wall members is formed by the shank of a screw, and the axially spaced rib-like projections thereof are formed by the screw flights. The outer wall is formed by a housing, such as the bore of an extruder barrel. The screw is revolved in the bore, the screw having a plurality of axially adjacent, helically extending channels defined therein between axially adjacent screw flights, whereby each of the channels is adapted to advance material along said bore as the screw revolves. Streams to be mixed are charged, each stream to a different one of such channels. At the end of this screw the respective streams from such channels are combined, that is, at the mouth or delivery end of the bore surrounding the screw.

In accordance with the preferred teachings of the present invention, in such a process can be practiced conveniently by having at least one of such channels directly fed from the flights (and associated channels therebetween) of a screw member which is longitudinally adjacent to, and coaxial with, such revolving wall member within the body of extruder which feeds hot melt helically, circumferentially, and axially into the process zone and into one or more of the channels within such zone. Also, simultaneously, the separate hot melt streams to be combined with the hot melt from the extruder body are supplied from circumferential positions along the process zone, such having been pre-processed separately outside of the process zone and outside of the extruder body. In other words, such a process is practiced preferably and conveniently with an apparatus as shown in FIG. 4.

The appearance of an extrudate from the exit 33 of extruder 26, especially in a sheet or film form is illustrated in FIG. 5. A characteristic striped or marbelized pattern is obtained, with each strip representing a different channel of a screw of this invention, such as channels 20 through 23 in screw 10.

The screw 10 of this invention can preferably produce a nonhomogeneous, incomplete mixing of several plastic melts, although channel depth and width in an individual screw of this invention regulate mixing in the region of secondary flights.

By locating the injection ports for different hot melt streams to be charged at different locations on the barrel of an extruder, such as barrel 27 of extruder 26, one can create different patterns of distribution for two or more different plastic melts and the extrudate product derived therefrom. Each melt used in the present invention may be pre-processed separately and independently outside of the region of the terminal section or mixing section of a screw of this invention. The condition of respective different melts, as respects such process variables as temperature, viscosity, degree of mixing, plasticity and the like, can thus be controlled to best satisfy the particular type of marbelizing or striped effect desired in a product article of manufacture. The mixture of hot melt plastics is physical and not mechanical in nature and can be made of non-compatible polymers.

A screw of this invention, together with the process described above, can be used not only to create color and texture effect for appearance or esthetic purposes, but also for making plastic fibers.

Incompatible melts may be mixed to a controlled degree and can be extruded in the form of strips or films. When subsequently cooled and stretched, such a strip or filament, owing to the different respective physical properties of mixed polymers, stretches within itself differently. As a result the stretched strip or filament can take on porosity or be splintered. The splintered product can be utilized for making plastic fibers. The porosity effect or the plastic fibers so produced are useful ingredients in the production of plastic papers or as paper reinforcing aids. The plastic fibers produced by the process of the present invention may also be used for any of the products now made with fibrillated shreads.

Other and further embodiments and variations of the present invention will become apparent to those skilled in the art from a reading of the present specification taken together with the drawings and no undue limitations are to be inferred or implied from the present disclosure.

What is claimed is:

1. A screw for an extruder comprising
   A. an elongated cylindrical shank having, in axially adjacent relationship, a mid-section, and a terminal section,
   B. said mid-section and said terminal section having an integral, primary, radially projecting, continuous helical flight extending axially therealong,
   C. said terminal section having a smaller diameter than said mid-section whereby when the screw is incorporated in an extruder barrel the extruder will be capable of accommodating a larger volume of material at the terminal section,
   D. at least one additional integral, secondary, radially projecting, continuous helical flight on said shank in axially spaced relationship to said primary flight, such secondary flight(s) commencing in said mid-section adjacent said terminal section and extending axially along said terminal section,
   E. said primary and said secondary flights when in functional combination with a given extruder barrel being adapted to minimize cross flow between axially adjacent flights, and being further adapted to mix to some predetermined extent within channels between axially adjacent such flights, of an extrudate being moved between said barrel and said shank by such flights.

2. A screw for an extruder comprising
   A. an elongated cylindrical shank having, in axially adjacent relationship, a beginning section, a mid-section, and a terminal section,
   B. said beginning section being adapted for engagement with means for rotatably driving said shaft, and to make sealing engagement with an adjacent wall member of a given extruder housing adapted for use with said screw,
   C. said mid-section having an integral, primary, radially projecting, continuous helical flight extending axially therealong and adapted in combination with the associated said shank to melt and mix an extrudate to a predetermined extent when said screw is operating in functional combination with said housing.
   D. said terminal section having a diameter smaller than the diameter of said mid-section, having said integral, primary, radially projecting, continuous flight extending therealong,
   E. at least one additional integral, secondary, radially projecting, continuous helical flight on said shank in axially spaced relationship to said primary flight, such secondary flight(s) commencing in said mid section adjacent said terminal section and extending axially along said terminal section,
   F. said primary and said secondary flights in combination in said terminal section being adapted to minimize cross flow between axially adjacent flights, and being further adapted to maximize mixing within channels between axially adjacent such flights, of an extrudate when said screw is operating in functional combination with said housing.

3. An extruder for plastics comprising
   A. a barrel having a cylindrical bore,
   B. a screw generally within the bore and adapted to advance plastic therealong, said screw having an elongated cylindrical shank having, in axially adjacent relationship, a mid-section, and a terminal section, said mid-section and said terminal section having an integral, primary, radially projecting, continuous helical flight extending axially therealong, and further having at least one additional integral, secondary, radially projecting, continuous helical flight on said shank in axially spaced relationship to said primary flight, such secondary flight(s) commencing in said mid section adjacent said terminal section and extending axially along said terminal section,
   C. said terminal section having a smaller diameter than said mid-section whereby said extruder will be capable of accommodating a larger volume of material at said terminal section,
   D. said primary and said secondary flights in combination with said barrel being adapted to minimize cross flow between axially adjacent flights, and being further adapted to maximize mixing within channels between axially adjacent such flights, of melted plastic, and
   E. means for injecting a resin into said extruder at said mid-section, and
   F. means for injecting a preprocessed hot melt material adjacent at least one of the channels defined between said primary and secondary flights.

4. An extruder for plastics and the like comprising
   A. a barrel having a cylindrical bore,
   B. a screw generally within the bore and adapted to advance plastic therealong,
   C. said screw having an elongated cylindrical shank with, in axially adjacent relationship, a beginning section, a mid-section, and a terminal section, said beginning section being adapted for engagement with means for rotatably driving said shaft, and to make sealing engagement with an adjacent wall member of a given extruder housing adapted for use with said screw, said mid-section having an integral, primary, radially projecting, continuous helical flight extending axially therealong and adapted in combination with the associated said shank to melt and mix an extrudate to a predetermined extent when said screw is operating in functional combination with said housing, and said terminal section having a diameter smaller than the diameter of said mid-section, having said integral, primary, radially projecting, continuous flight extending axially therealong,
   D. said screw further having at least one additional integral, secondary, radially projecting, continuous helical flight on said shank in axially spaced relationship to said primary flight, such secondary flight(s) commencing in said mid section adjacent said terminal section and extending axially along said terminal section, E. said primary and said secondary flights in combination in said terminal section being adapted to minimize cross flow between axially adjacent flights, and being further adapted to maximize mixing within channels between axially adjacent such flights, of an extrudate when said screw is operating in functional combination with said housing, F. means for injecting into said barrel radially adjacent at least one of said channels a preprocessed hot melt to be combined with plastic material within said bore, and G. said barrel having an input port in the side thereof radially adjacent said mid-section and longitudinally adjacent said beginning section, having an end aperture at one end thereof through which a portion of said beginning section projects, having an end aperture at the opposite end thereof through which plastic is extruded in an operating said extruder, and port means for said injecting means.

5. A process for combining at least two separate streams comprising the steps of simultaneously, A. revolving one of a pair of generally concentric, cylindrical wall members relative to the other thereof within a process zone, there being a plurality of axially adjacent, helically extending channels radially defined therebetween by said respective wall members and axially defined therebetween by a plurality of axially spaced, rib-like projections each integral with said revolving one of said wall members and radially extending therefrom to a position in spaced adjacent relationship to such other one of said wall members, whereby each of said channels is adapted to advance material therealong as said one wall member so revolves, from one end to the opposite end of said process zone, B. charging separate streams to be combined to respective individual ones of said channels along said process zone, and C. combining at said opposite end the respective streams from said so-charged channels.

6. A process for combining at least two different thermoplastic hot melt streams comprising the steps of A. revolving a screw in a bore, said screw having a plurality of axially adjacent, helically extending channels defined therein between axially adjacent screw flights, whereby each of said channels is adapted to advance material along said bore as said screw revolves, B. charging said streams each to a different one of said channels, and C. combining said streams from said channels at the delivery end of said bore.

* * * * *